United States Patent
Macor

(10) Patent No.: US 12,528,310 B2
(45) Date of Patent: Jan. 20, 2026

(54) DECORATED PANEL, METHOD FOR ITS PRODUCTION AND SYSTEM FOR CARRYING OUT THIS METHOD

(71) Applicant: Giorgio Macor, Martignacco (IT)

(72) Inventor: Giorgio Macor, Martignacco (IT)

( * ) Notice: Subject to any disclaimer, the term of this patent is extended or adjusted under 35 U.S.C. 154(b) by 249 days.

(21) Appl. No.: 18/020,919

(22) PCT Filed: Aug. 13, 2021

(86) PCT No.: PCT/IB2021/057472
§ 371 (c)(1),
(2) Date: Feb. 10, 2023

(87) PCT Pub. No.: WO2022/034546
PCT Pub. Date: Feb. 17, 2022

(65) Prior Publication Data
US 2023/0302846 A1    Sep. 28, 2023

(30) Foreign Application Priority Data
Aug. 13, 2020    (IT) .................... 102020000020143

(51) Int. Cl.
B44C 5/04     (2006.01)
B05D 5/02     (2006.01)
B05D 7/00     (2006.01)

(52) U.S. Cl.
CPC ............... *B44C 5/04* (2013.01); *B05D 5/02* (2013.01); *B05D 7/586* (2013.01)

(58) Field of Classification Search
CPC ............... B44C 5/04; B05D 7/586; B05D 5/02
USPC ............................................. 428/172
See application file for complete search history.

(56) References Cited

U.S. PATENT DOCUMENTS

| | | | |
|---|---|---|---|
| 2005/0129970 A1* | 6/2005 | Yokochi | B44C 5/0476 428/542.2 |
| 2005/0208275 A1* | 9/2005 | Abe | B32B 27/20 428/195.1 |
| 2010/0291372 A1 | 11/2010 | Barwich | |
| 2016/0145449 A1* | 5/2016 | Hilgers | C09D 4/00 522/18 |

FOREIGN PATENT DOCUMENTS

| | | |
|---|---|---|
| EP | 1495860 A1 | 1/2005 |
| EP | 1520693 A1 | 4/2005 |
| EP | 2045393 A1 | 4/2009 |
| EP | 2363299 A1 | 9/2011 |
| WO | 2014207103 A1 | 12/2014 |
| WO | 2018069874 A1 | 4/2018 |
| WO | 2020039361 A1 | 2/2020 |

* cited by examiner

*Primary Examiner* — Tahseen Khan
(74) *Attorney, Agent, or Firm* — Maschoff Brennan

(57) ABSTRACT

The present invention refers to a decorated panel composed as follows: a substrate; a decorative layer applied to at least part of the substrate; a photo-crosslinkable formulation applied directly or indirectly on a part of the substrate and/or on the decorative layer, that is, with the interposition of further layers of intermediate material on at least a part of the substrate and in one or more layers, containing at least one photo-crosslinkable resin; at least one thermoplastic resin; at least one polymerization initiator including but not limited to UV photoinitiators, organic peroxides, Electron Beam.

15 Claims, 4 Drawing Sheets

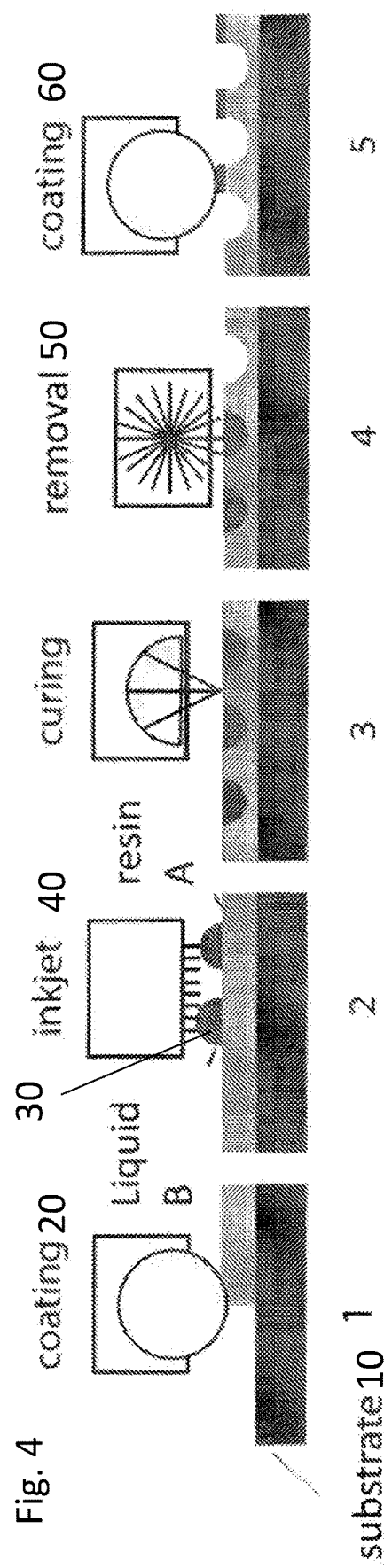

DECORATED PANEL, METHOD FOR ITS PRODUCTION AND SYSTEM FOR CARRYING OUT THIS METHOD

FIELD OF THE INVENTION

The present invention relates to a photo-crosslinkable formulation and to a decorated panel made in this way.

The present invention also refers to a method for making said panel and to a plant for carrying out said method.

In particular, the invention relates to a floor decorated and textured by digital printing, the various layers of paint to protect it and a method for making it.

The present invention is part of the technical field of materials and in particular for making panels for the production of floors, coverings, furnishings and more generally for architectural and design surfaces.

The present invention exploits the combination of traditional technologies, which offer high mechanical, chemical-physical properties, low costs and the versatility of digital technologies that allow total customization and high precision.

STATE OF ART

The panels for the production of flooring and furniture that reproduce wood and other natural materials in color and touch, are generally made of wood-derived materials such as HDF, MDF and chipboard or synthetic materials such as PVC (SPC, LVT, WPC) and recently polyolefins such as PE and PP.

In particular, in the case of traditional floors made of wood and derivatives (MDF/HDF/Particleboard/plywood), the decoration printed on paper is applied to the substrate and normally protected by the application of amino plastic resins. The process takes place in continuous or discontinuous presses by applying pressure and heat. The resulting surface is extremely resistant to scratches and abrasion. The product obtained in this way is commonly called laminate.

In the case of synthetic floors such as LVT (Luxury Vinyl Tile), the decoration printed on plastic film is applied to the substrate and normally protected by applying a wear layer consisting of a thick film (300-500 μm) of PVC. The process takes place in continuous or discontinuous presses by means of pressure and heat. The surface is then generally finished by applying a photo-crosslinkable paint in order to obtain the desired gloss and impart scratch resistance.

Digital printing and in particular inkjet printing is increasingly establishing itself in industrial sectors, replacing traditional methods based on analogue printing. The advantages of digital printing are considerable and include high flexibility, the ability to produce short runs and the reduction of consumables waste.

In particular, the reproduction of wood on various materials represents a typical application of digital printing for the production of floors, furniture panels, skirting boards, profiles and in general in the field of design and architecture.

Direct-to-board industrial digital printing involves direct decoration of the substrate and generally uses light-curable inks.

The latter, once polymerized, do not have thermoplastic characteristics and consequently cannot be used with the lamination techniques described above. On the other hand, direct decoration is becoming more and more widespread in the market and it is necessary to develop a specific protection cycle for synthetic and non-synthetic materials, which can offer the desired characteristics of resistance to abrasion, scratch and other listed properties such as those indicated in the standards EN15468: 2016 and/or EN16511: 2019. Furthermore, the cycle must be texturizable by means of traditional analog technologies or better, by means of digital texturing technologies such as for example those described in WO2018069874A1 and WO2020039361A1.

The light cross-linked paints normally used for the protection of wooden floors (parquet) do not have sufficient anti-abrasive characteristics. In order to increase abrasion resistance, it is therefore necessary to use substances such as aluminum oxide in the formulation and apply considerable quantities of them, about 100-150 g/m2.

Photoreticulable paints after polymerization show shrinkage around 10-20% by volume, causing deformation of the substrate. This phenomenon is strongly accentuated in the case of plastic flooring and even more so when the material is tested for dimensional stability at 80° C. for 4 h.

It is therefore necessary to develop a formulation and a painting cycle capable of protecting the underlying decoration from abrasion and at the same time being flexible to avoid deformation of the panel.

It should be noted that, currently, as shown in documents WO2014/207103 and EP1495860 and EP1520693, the finishing layers with anti-wear and/or anti-scratch effects or with effects of modification of the gloss/opacity of the coating layer and which consist from a composition comprising at least one photo-crosslinkable resin have relatively limited thicknesses with respect to the overall thickness of the rigid substrate that forms the base layer of the panel and at most of the order of at most 50 micron and preferably below 25 micron, while the total mass of the said composition also comprising reinforcing particles of abrasion and scratch resistance is of the order of a maximum of 30 g/m2 considering thicknesses of the substrate on which the anti-wear and/or anti-scratch terminal layer is applied in the order of size of about 250 micron.

The thickness of the anti-wear and anti-scratch finishing layer envisaged in the state of the art is well below the thicknesses required for the anti-wear and anti-scratch layers required in the construction of floor panels. In these cases, in fact, the thickness typically provided for the anti-wear and/or anti-scratch layer is about 300 to 500 μm and the mass of material of said layer is of the order of magnitude of about 100 to 150 g/m2. Considering the thicknesses and mass provided for in the documents of the state of the art, on the one hand the protective anti-wear and anti-scratch effect is considerably reduced, on the other hand the effect of thermal shrinkage is limited or does not appear because the rigid support to which the terminal anti-wear layer is applied for the realization of the panels has a considerably greater thickness and the thermal shrinkage of the anti-wear layer is not able to exert sufficiently large shrinkage forces to cause deformations of the panels, such as aforementioned transverse and/or longitudinal arches.

However, the use of relatively thin anti-wear and/or anti-scratch layers constitutes a drawback, especially considering the considerable mechanical stresses that said anti-wear end layers undergo in a floor. In this application, in fact, the paths followed in the movements by people tend to statistically concentrate on common path bands, so that within these bands the action of wear and/or scratching is more frequent than in the area of the floor that do not coincide with the said bands. This implies an uneven wear of the surface of a floor made with panels according to the state of the art and therefore the fact that after a certain period of time the external appearance of the floor along the said passage bands and in the less frequent passage areas is uneven.

The technical problem of the thermal shrinkage effect of the anti-wear and/or anti-scratch layer does not appear to be addressed in the aforementioned documents. In particular, WO2014/207103, has as its purpose the realization of a photo cross-linked composition for the realization of an anti-wear and/or anti-scratch layer that can also be applied by means of spray painting techniques and/or digital painting techniques, such as, for example, using ink-jet painting techniques.

As it will appear more clearly, this object is in contrast with an aspect or an object of the present invention which is to increase the effect of resistance to wear and/or to scratching; since this increase in resistance is linked to the use in considerable quantities of additive components that increase the surface mechanical resistance of the anti-wear and/or of the anti-scratch layer, so that an application by means of traditional digital painting techniques and in particular by means of ink-jet systems of the anti-wear and/or anti-scratch layer or layers is not provided considering the current standards of existing ink-jet systems.

Technical Problem of the Invention

A first aspect of the present invention is therefore the one of providing a photo-crosslinkable formulation for the production of at least one final anti-wear layer and/or one final anti-scratch layer and/or one final finishing layer for coating a substrate that offers an effective resistance to wear and scratches and whose exposed surface is also three-dimensionally formable by traditional mechanical forming systems or by digital printing systems (embossing) of forming liquids on the surface of said final layer, for example by using ink-jet printers.

A further object of the present invention is to provide a formulation of the aforesaid type which presents characteristics of mechanical resistance to wear and scratches improved with respect to the state of the art and which at the same time can present characteristics of elastic deformability and/or plastic adaptability which limit the effect of the thermal dimensional shrinkage of the said formulation, avoiding deformation phenomena of the substrate such as for example the longitudinal and/or transverse arching which, in the formulations for the said terminal layer known in the state of the art when applied in the quantities and with the increased thicknesses indicated above cause these deformations.

According to yet another aspect, an object of the present invention is to provide a formulation which, in addition to satisfying the previous aspects, can be applied in its basic composition by varying the quantity and type of additives for the realization of further intermediate layers which may be provided between the substrate and the anti-wear and/or anti-scratch and/or finishing layer, such as for example one or more base layers such as at least one layer of putty, at least one primer layer, at least one decorative layer.

According to a further aspect of the present invention, at least the said anti-wear and/or anti-scratch and/or final finishing layer consist of a formulation whose surface can be three-dimensionally formed by means of one or more of the currently known techniques, both, mechanical by means of continuous and/or discontinuous molds, and according to digital types by means of localized application according to pre-established patterns of localized distribution of forming liquids that locally deform the surface of the terminal layer and/or of forming liquids that locally modify the chemical/physical characteristics of the final layer at the sites at which they are applied making the areas on which said liquids are distributed differently resistant to removal means with respect to the areas on which said liquids have not been applied. Preferred examples of such techniques which will be described in greater detail below are described for example in documents WO2018069874A1 and WO2020039361A1.

SUMMARY OF THE INVENTION

The invention achieves the above purposes with a decorated panel consisting of at least one substrate comprising two opposite faces which are spaced apart by a predetermined thickness and on at least some areas and/or on the entire surface of one of said faces, in particular the front face, there is applied at least one anti-wear and/or anti-scratch layer, consisting of a photo-crosslinkable formulation comprising:
  i. At least one light crosslinkable resin;
  ii. At least one thermoplastic resin;
  iii. At least one polymerization initiator, including but not limited to UV photoinitiators, organic peroxides, Electron Beam.

According to an embodiment, the said anti-wear and/or anti-scratch layer is applied on at least one further intermediate layer consisting of a decoration layer which is applied on at least a part of the surface of the said face of the said substrate or on the entire surface of the said face.

Still according to a possible embodiment, the decoration layer is applied on one or more intermediate layers provided between the said face of the said substrate and the said decoration layer consisting of one or more base layers, such as, for example, at least one layer of putty and/or at least one primer layer and/or at least one colored base layer.

Still according to a further embodiment which can be provided in any combination or in combination with one or more of the previous embodiments, on the anti-wear and/or on the anti-scratch layer it is possible to apply a further finishing layer, such as for example, a layer of variation of the glossy/opacity appearance of the finished panel surface.

As it will appear in greater detail below, the different layers listed above according to the different combinations of the above listed embodiments and the composition chosen for said one or more anti-wear and/or anti-scratch layers and/or for any further layer can be applied using one or more of the application techniques provided in the state of the art, such as, for example, but not limited to, application by printing, application by spatula, application by spraying and/or application by digital techniques, in particular ink-jet.

As it will appear in greater detail below, the preferred embodiment of the formulation of the anti-wear and/or anti-scratch layer according to the present invention, this anti-wear and anti-scratch layer is preferably applicable by means of spreading, spatulating and/or printing techniques which do not require application by spraying.

According to an embodiment, the panel according to the present invention comprises at least one anti-wear and/or anti-scratch layer with a thickness ranging from about 200 to 800 microns, preferably from about 300 to 500 μm.

According to an embodiment, the panel according to the present invention comprises at least one anti-wear and/or anti-scratch layer consisting of a mass of about 150 g/m2.

One embodiment provides that the anti-wear and/or anti-scratch layer also called top coat in technical jargon is composed of at least two layers overlapping each other and which have an identical basic composition according to the previously indicated embodiment and each of which differs on the other hand, due to the presence of a different quantity of the basic components, that is, of the photo-crosslinkable resins and of the thermoplastic resins and/or of the type of these and/or optionally also alternatively or in combination in relation to the quantity and quality of additives.

Alternatively, or in combination with the aforesaid differences, in an embodiment variant the at least two layers forming the anti-wear/anti-scratch layer are provided with different thicknesses from each other and in different quantities for each of said two layers.

In a non-limiting variant embodiment, the outermost layer of the two layers that form the anti-wear and/or anti-scratch layer has a greater thickness than the second layer which is more internal, i.e. adjacent to the face of the first, facing the substrate.

In one embodiment, the mass of said first layer is about 150 g/m2, while that of the second of said at least two layers is less, for example 30 g/m2.

Still in a variant embodiment, the anti-wear and/or anti-scratch layer consists of at least three layers comprising a further third outermost finishing layer.

According to an embodiment, the surface of the panel is provided with a three-dimensional structure composed of hollows and protrusions, or concave zones and convex zones, according to a predetermined design, also called texture in the technical jargon of the branch, the said hollows and the said protrusions presenting predetermined thicknesses and depth.

In one embodiment, said recesses and said projections extend at most for a thickness less than the overall thickness of the anti-wear and/or anti-scratch layer and, in particular, in combination with the embodiment which provides that said anti-wear and/or anti-scratch layer is formed by two or three layers, said recesses and said protrusions extend for a substantially corresponding thickness and/or slightly less than the overall thickness of the two outermost layers of the combination of said three layers.

Thanks to the invention which provides a composition of an anti-wear and/or anti-scratch final layer in the form of a hybrid system with thermoplastic characteristics consisting of the combination of photoreticulable resins and non-photoreticulable thermoplastic resins as a basic formulation to which additional additives can be added depending on the needs as will be indicated below, it is possible to provide relatively high quantities and thicknesses of the anti-wear and/or anti-scratch layer compared to those envisaged by the existing solutions, giving greater resistance to wear and scratching of the panel and preventing that the shrinkage of the mass of the anti-wear layer and/or scratch-resistant layer during the cooling phase can cause undesired deformations of the panel such as longitudinal and/or transverse arching of the finished panel.

Photoreticulable or rather energy curable resins are united by the fact that they polymerize and harden thanks to the energy radiated by ultraviolet ray devices and/or by irradiation with EB (Electron Beam) or with the addition of organic peroxides and are divided into two types on the basis of these cross-linking mechanisms, both types or combinations of which can be used for the process according to one or more of any of the aforementioned embodiments and variants:

1) radical resins, typically from vinyl monomers and acrylate resins which are divided into several subcategories: epoxy-acrylates, urethane-acrylates, polyester-acrylates, polyether-acrylates, amino-acrylate, silicone-acrylates, polyisoprene-acrylate, polybutadiene acrylate and acrylate monomers. Among the vinyl monomers we can mention N-vinyl caprolactam (NVC), acryloylmorpholine (ACMO), diethyleneglycol divinyl ether (DVE-2), triethyleneglycoldivinyl ether (DVE-3) and their mixtures. It should be emphasized that here the term acrylate means both acrylate and methacrylate resins.

2) cationic resins such as epoxy resins, polyols and monomers such as oxetanes and vinyl ethers.

More information on photoreticulable systems can be found in the text "Radiation Curing: Science and Technology" (Pappas).

The thermoplastic resins that can be used in combination with the photo-crosslinkable systems according to one or more of the embodiments indicated above can be, for example, made up of thermoplastic resins included in the following non-exhaustive and non-limiting list:

polybenzimidazole PBI
PC polycarbonate
PE polyethylene
PET polyethylene terephthalate
PMMA polymethylmethacrylate
polypropylene PP
PS polystyrene or polystyrene
PVC polyvinyl chloride
PA polyamide
acrylonitrile butadiene styrene ABS
PLA polylactic acid
PTFE polytetrafluoroethylene
polyethersulfone PES (U)
POM polyoxymethylene
PVAc polyvinyl acetate
EVA ethylenevinylacetate copolymer
TPU thermoplastic polyurethanes and by combinations of one or more of the aforesaid resins and/or from mixtures and copolymers of the aforesaid resins.

With reference to any of the embodiments and variants described above, typically the thermoplastic resin is used dissolved in the photo-crosslinkable resin between 1% and its solubility limit which is a function of the chemical nature of the resin and its molecular weight.

In another embodiment of the invention which can be provided in any combination or sub-combination with one or more of the previous embodiments or variants, the thermoplastic polymer is not dissolved in the photo-crosslinkable resin but is dispersed therein.

In a preferred form of the invention, the formulation object of the invention comprises one or more photo-crosslinkable resins, photoinitiators, one or more thermoplastic resins and can contain fillers, such as aluminum oxide (corundum) to increase its resistance to abrasion, and optionally one or more of the components of the following list:

talc to modify its rheology,
silica to reduce its brilliance,
calcium carbonate as filler,
pigments to impart color,
additives such as leveling and/or wetting and/or
sliding and/or rheology modifiers.

In another embodiment of the invention which can be provided in combination with one or more of the previous embodiments and/or executive variants, the formulation object of the invention can contain other non-crosslinkable systems such as epoxy, polyurethane, acrylic and/or combinations of these resins.

In another embodiment of the invention that can be provided in combination with one or more of the previous embodiments and/or variants, the formulation object of the invention may undergo a secondary cross-linking process (dual-cure).

The painting cycle object of the invention can comprise various alternatives, such as the direct application of only the anti-wear and/or anti-scratch layer, according to any of the forms and variants described above, on at least one face of a substrate in order to protect the surface of the said face of the said substrate and/or the application of the said anti-wear and/or anti-scratch layer, according to any of the forms and variants described above, on a combination of one or several layers interposed between the said anti-wear layer and/or anti-scratch and the substrate and which may vary according to the type of substrate and the degree of protection desired, and/or the application for which the substrate is intended.

The invention relates to a method for making a panel according to one or more of the forms and executive variants described above, which method involves the following steps:
optional surface processing to prepare a substrate;
preparation of a photo-crosslinkable formulation of at least one coating/painting layer, in particular of at least one anti-wear and/or anti-scratch layer according to one or more of the forms and embodiments described above;
application of said photoreticulable formulation on at least one of the surfaces of said substrate by means of techniques selected from those in the following list: roller application, application by spraying, application by veil, application by drawing, application by slot-die, application by spatula and/or spreading for the formation of said anti-wear and/or anti-scratch layer;
photoriculation of the said anti-wear and/or anti-scratch layer;
final heat treatment of the combination of substrate and anti-wear and/or anti-scratch layer.

According to an embodiment of the said process, upstream of the said final heat treatment step, before or after the photoreticulation step of the said at least one anti-wear and/or anti-scratch layer, a three-dimensional forming step is provided for the exposed surface of the said layer, i.e., the surface opposite to the substrate, which means a step of generating a three-dimensional structure comprising a combination of recesses and protrusions distributed according to a predetermined pattern on said surface.

Said three-dimensional forming step can be performed using various known techniques such as, for example, continuous and/or discontinuous impression molding molds, or through the use of forming techniques which involve the use of a forming liquid which is distributed in selected areas of the surface of said layer according to a predetermined distribution pattern by means of a digital application device, such as an inkjet printer and which liquid physically and/or chemically interferes with said layer, generating the combination of recesses and protrusions corresponding to the pattern of distribution foreseen at the end of an elimination step by drying and/or removal from said selected zones or from the zones adjacent to the latter.

In a first embodiment of the said forming step, the method provides applying on the non-cross-linked or partially cross-linked surface, that is, non-gelled or partially gelled surface, an aqueous-based forming liquid by means of an inkjet printer which distributes the said liquid according to a digital distribution model corresponding to the provision of hollows and protrusions along the surface of the said at least one anti-wear and/or anti-scratch layer and the subsequent elimination of the said forming liquid in a drying phase which can take place before, after and/or simultaneously to the photo cross-linking step of the said anti-wear and/or anti-scratch layer and/or before, after or simultaneously to the final heat treatment step of the said anti-wear and/or anti-scratch layer.

A technique of this type is described in detail in WO2018069874 which is included in the present description by reference.

An alternative embodiment for the said forming step provides for applying a forming liquid on the non-cross-linked or partially cross-linked surface, i.e. non-gelled or partially gelled surface by means of an inkjet printer which distributes said liquid according to a digital distribution model corresponding to the provision of grooves and protrusions along the surface of said at least one anti-wear and/or anti-scratch layer and in which
the forming liquid consists of a polymerization inhibitor and/or interacts with the formulation of said at least one anti-wear and/or anti-scratch layer, generating a combination having a different hardness or brittleness with respect to the formulation of said at least one anti-wear and/or anti-scratch layer, the crosslinking and/or gelling of the formulation that constitutes the anti-wear and/or anti-scratch layer and the polymerization of the forming liquid in a phase that can take place before, after and/or simultaneously with the photo-reticulation phase of the said anti-wear and/or anti-scratch layer and/or to the final heat treatment step of the said anti-wear and/or anti-scratch layer and the subsequent elimination of the said forming liquid possibly in combination with at least a part of the underlying layer and coinciding with the formulation of the said anti-wear and/or anti-scratch layer by action mechanical, hydraulic and/or pneumatic removal.

This alternative embodiment is described in detail in WO2020039361A1 which is incorporated in the present description by reference.

According to yet another embodiment which can be provided in combination with any of the previous embodiments, the method can provide for the application on top of said at least one anti-wear and/or anti-scratch layer of at least one finishing layer, this application being preferably performed after the step of three-dimensional forming of the surface of the anti-wear and/or anti-scratch layer, said forming being performed on the combination of said anti-wear and/or anti-scratch layer and of said finishing layer.

According to yet another embodiment of the aforesaid method, the application of the anti-wear and/or anti-scratch layer is carried out in two phases, by being applied on the substrate, a first lower anti-wear and/or anti-scratch layer and on top of this first layer at least a second anti-wear and/or scratch-resistant layer, the said first layer being different from the said second layer as regards the composition of the formulation and/or the quantity of material and/or the thickness, preferably being the quantity and/or the thickness of the material of the second layer greater than those of the first layer, while the recesses of the three-dimensional structure do not exceed in depth the thickness of the said second layer.

According to yet another feature of the method according to the present invention, it is possible to provide application steps of one or more intermediate layers on the substrate before applying the at least one anti-wear and/or anti-scratch layer.

Said one or more layers being applied in succession on each other through the use of application techniques such as the techniques selected from those in the following list: roller application, spray application, veil application, drawing application, application by slot-die, application by spatula and/or spreading application by digital techniques as application by ink-jet printer.

It should be noted that this list is not to be considered exhaustive and not even limited to the application techniques known to date, as it is possible to use any application technique suitable for the type of material of which the layer to be applied is made.

According to an embodiment of the method, said one or more layers can consist of one or more layers selected from the following list:
- an optional layer of grouting;
- an adhesion primer of a colored base;
- a colored base layer, preferably white;
- an adhesion primer for a decoration layer on said colored base layer;
- a decoration layer.

Preferably but not in a limiting way, said layers are provided starting from the surface of the substrate towards the first anti-wear and/or anti-scratch layer in the order mentioned above.

According to a preferred embodiment, the decoration layer consists of an image which is reproduced on the surface of any base layer and/or any printing primer layer applied by a digital device, for example, by an inkjet printer.

Advantageously, according to an embodiment of the present invention, the three-dimensional structure of the anti-wear and/or anti-scratch layer, optionally in combination with the finishing layer, is provided in register with the image reproduced in the decoration layer.

In one embodiment, for example in the case of reproductions of natural materials such as wood, mineral material or stones, the chromatic representation of the surface of a sample in said natural material and the conformation of the three-dimensional structure of said surface are acquired by scanning the said surface of said sample, generating from said scan a digital image model that reproduces the chromatic aspect of the surface of said natural sample and a digital model that reproduces the conformation of the three-dimensional structure of the surface of said sample, which models are in register with each other and which models are used to control the ink-jet printers for the application of the decoration and for the application of the molding liquid, thus generating a panel whose surface reproduces the chromatic appearance of the natural surface and in register with this one the appearance of the three-dimensional conformation of the surface.

This technology known as EIR (Embossing in Register) is preferably performed using a process such as the one described above. However, it is possible to use in the same way variants of the techniques for applying the decoration layer and/or the three-dimensional shaping that are known to the state of the art.

The invention also relates to a plant for the implementation of the aforementioned method for the production of a panel according to one or more of the previous claims and which plant includes:
- at least one station for applying at least one anti-wear and/or anti-scratch layer on the surface of at least one face of a substrate;
- at least one surface forming station of said at least one anti-wear and/or anti-scratch layer;
- at least one photoreticulation station of the said wear and/or anti-scratch layer
- and at least one heat treatment station for heating said substrate with said at least one anti-wear and/or anti-scratch layer.

Corresponding to the different variants and embodiments previously described of the method according to the present invention, the plant can be provided with one or more of the following stations in succession according to the order of citation:
- a first station for preparing at least one surface of a substrate by polishing the surface of the substrate;
- a station for applying a putty to at least one surface of the substrate;
- a drying and/or crosslinking station for said putty;
- a sanding station for said putty;
- a station for applying a primer of a colored base, preferably white on said surface of the substrate and/or on said layer of putty;
- a drying and/or crosslinking station of said colored base layer;
- a station for applying a printing primer for a decoration layer;
- a drying and/or crosslinking station of said printing primer;
- a station for applying said decoration layer to said primer layer;
- a drying and/or crosslinking station of said decoration layer;
- a station for applying at least one anti-wear and/or anti-scratch layer;
- an optional drying and/or crosslinking station at least partially of said at least one anti-wear and/or anti-scratch layer;
- optional at least one further station for applying at least one further anti-wear and/or anti-scratch layer and associated optional drying and/or at least partial crosslinking station of said at least one anti-wear and/or anti-scratch layer;
- a station for applying at least one finishing layer;
- an optional drying and/or at least partial crosslinking station of said at least one finishing layer;
- a three-dimensional forming station, according to a predetermined model;
- a final crosslinking and/or final heating heat treatment station;
- an optional elimination station of selected parts of the thickness of the at least one anti-wear and/or anti-scratch layer possibly in combination with at least one finishing layer superimposed on it.

Depending on the type of application technique chosen from those available, the different application stations are equipped with corresponding application units.

In particular, for the application of the decoration layer, the use of digital printers and especially ink-jet printer is preferred.

According to an embodiment, the three-dimensional shaping of the wear-resistant and/or scratch-resistant layer, optionally in combination with the finishing layer on top of it, can be carried out by means of continuous or discontinuous mechanical molds.

Alternatively, the three-dimensional forming is performed using an embossing liquid, that is an embossing liquid which is distributed according to the distribution model envisaged by means of a digital printing and in particular by means of an ink-jet printer.

As devices for removing selected areas of the thickness of the at least one anti-wear and/or anti-scratch layer optionally in combination with at least one finishing layer superimposed on it according to the variant of the method described above and relating to the technology described in document WO2020039361A1, the station for removing said parts can comprise alternatively or in combination mechanical tools, such as brushes or the like, or nozzles for blowing a flow of a gaseous fluid or liquid removal optionally in combination with abrasive particles carried by said flow, suction ports.

BRIEF DESCRIPTION OF THE DRAWINGS

Some exemplary embodiments of the present invention will be described in greater detail below with reference to the attached drawings, in which:

FIG. 4 schematically shows a second embodiment of the three-dimensional structuring method, i.e., surface embossing of the wear-resistant and/or scratch-resistant layer of the panel according to the present invention.

In the present description, as well as in the preceding introductory parts and in the claims, the terms crosslinking, photoreticulation and polymerization are to be considered equivalent to each other and falling within the more generic definition of crosslinking or polymerization or gelling by means of energy irradiation.

Furthermore, in the present description as well as in the preceding introductory parts and in the claims the terms embossing, forming, texturing, three-dimensional surface configuration are to be considered equivalent and falling within the more generic definition of three-dimensional surface forming comprising a distribution of alternating grooves and protrusions according to a predetermined distribution design.

Figure 1:
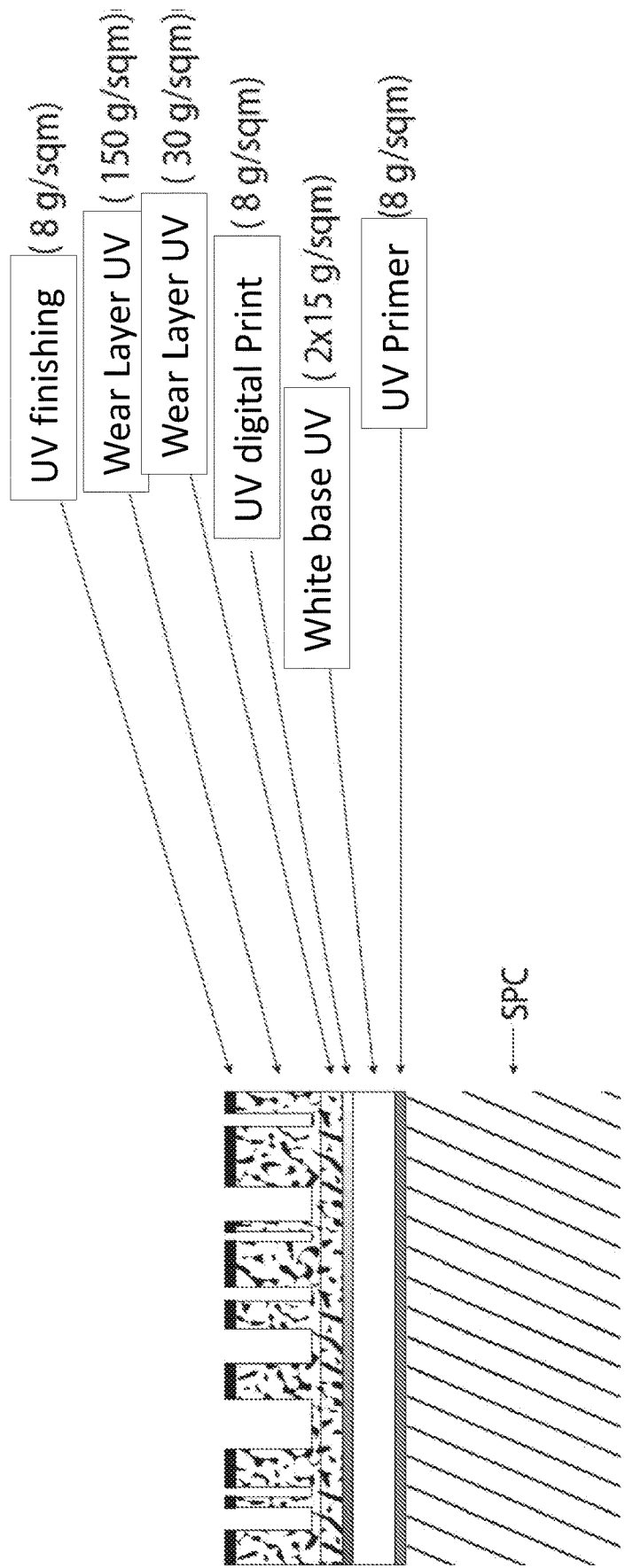
FIG. 1 illustrates the succession of layers to produce the decorated panel object of the invention. In particular, the figure represents a decorated panel in plastic material that can be used for flooring.
Figure 2:
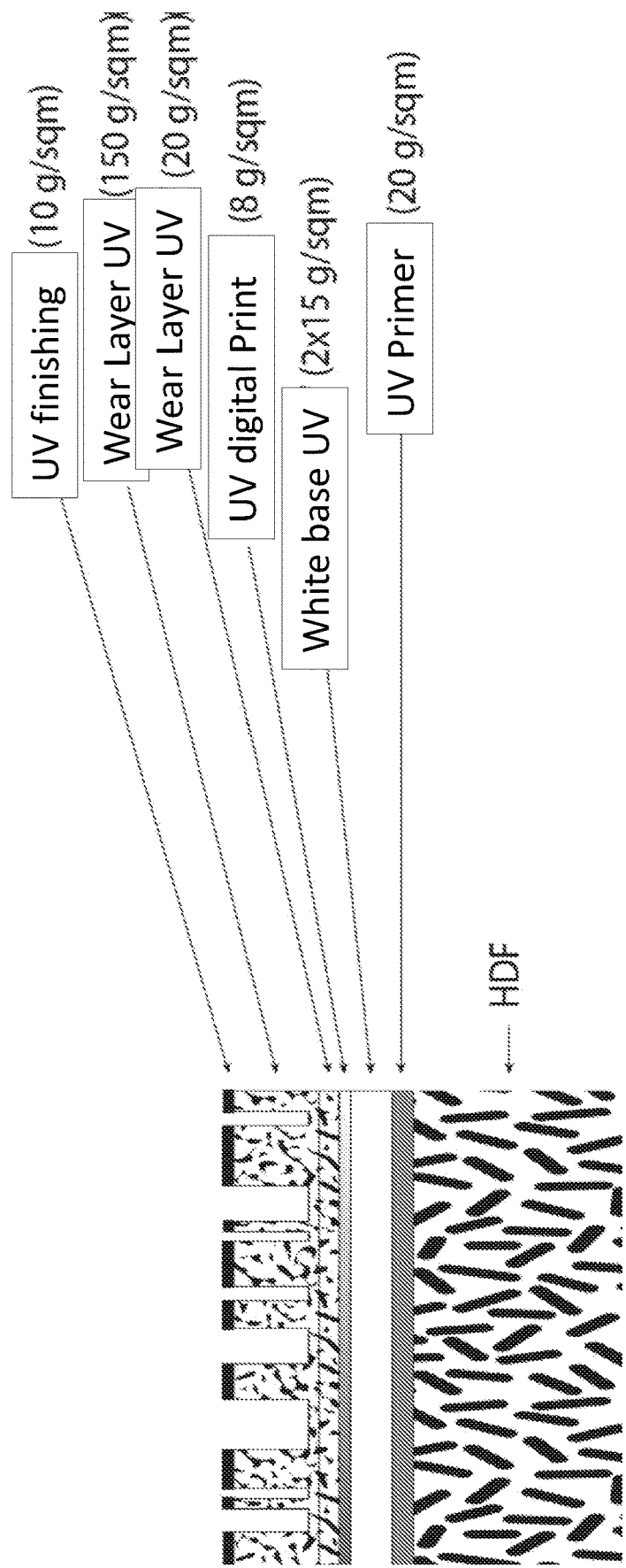
FIG. 2 shows, similarly to FIG. 1, a decorated panel in HDF that can be used for flooring.

In FIG. 1 a painting cycle for SPC is schematized while in FIG. 2 a painting cycle for HDF is schematized.

According to some embodiments, the painting cycle object of the invention can be performed using conventional techniques in use, such as roller/spray/veil/die/slot-die.

Typically, the paint object of the invention is advantageously used for the production of furniture and/or floors. The preparation and finishing cycle depends on the material to be decorated and on the desired performance.

With reference to the example of a typical cycle for the decoration of SPC (Stone Plastic Composite), a material currently in vogue for the production of flooring, it involves the following processes:

TABLE 1

| Operation | application | typy | g/m2 | note |
| --- | --- | --- | --- | --- |
| Smoothing of the substrate | | | | optional |

TABLE 1-continued

| Operation | application | typy | g/m2 | note |
| --- | --- | --- | --- | --- |
| Adhesion primer | roll | UV | 8/10 | optional |
| White base | roll | UV | 20/40 | One or more applications |
| Primer for print | roll | UV | 8/10 | optional |
| Digital print of decor | roll | UV | | optional |
| Anti-wear layer | roll | UV | 80/200 | One or more applications The quantity depends on the degree of abrasion resistance desired |
| Finishing | roll | UV | 10/20 | Optional. For scratch protection and to obtain the desired degree of opacity |

In order to obtain different aesthetic effects, the wear layer and the finishing layer can have different degrees of opacity. In fact, if the wear layer has a higher degree of gloss than the finishing layer, a pore will be obtained, or a hollow in the three-dimensional, shiny structure, which will consequently be highlighted.

On the contrary, if the wear layer and the finishing layer have the same degree of gloss, the pore will be less evident but with a more natural effect.

As previously highlighted in the present description, each layer or at least some of the layers of the painting cycle can consist of a formulation according to the more general composition of the present invention, that is, comprising:
  i. At least one light crosslinkable resin;
  ii. At least one thermoplastic resin;
  iii. At least one polymerization initiator, including but not limited to UV photoinitiators, organic peroxides, Electron Beam, The different layers differing in relation to the quantity and/or type of said components and/or in relation to the presence of one or more different additives and/or different quantities of said one or more additives.

In a preferred form of the invention, the painting cycle is heat treated. Temperature and time are a function of the molecular weight and chemical nature of the resin itself. Typically, the heat treatment takes place after the photopolymerization step.

Surprisingly, after heat treatment, a dull surface is formed. The heat treatment can take place by means of hot air or by direct irradiation with IR, NIR rays.

Below is an example of a preferred and non-limiting painting cycle of the present invention:

Example 1

A varnish base is prepared consisting of:
HDDA acrylate monomer: difference to 100%
TMPTA acrylate monomer: 20%
CN981 acrylate oligomer: 10%
thermoplastic resin (see table 2)

photoinitiator IRGACURE 1173: 3%
TPO photoinitiator: 0.1-5% (5% for white)
Titanium oxide (20%) is then added to the base to prepare the white base paint or aluminum oxide (25%) to prepare the shatterproof paint or the wear layer.

The line used for decoration and finishing is composed of normal or reverse roller machines for the application of paints, 6-color single-pass printer for decoration, single-pass jet-printer for texturing, or for the application of the texturing liquid, brushing members for the removal of the areas treated with the texturizing liquid.

The application and printing speed is 30 m/min. The white paint is applied by roller with 2 applications of 15 g/m2 to a substrate of SPC of 2.5 mm and gelled with 2 Ga lamps of 120 W/cm.

The substrate is printed with the decoration layer and then a first coat of shatterproof paint (30 g/m2) is applied which is gelled with 1 120 W/cm Hg lamp followed by another application of a second layer of the same material of 150 g/m2. This second layer is subjected to the three-dimensional forming process, i.e., texturization and is subsequently gelled with 2 120 W/cm Hg lamps.

Subsequently, a finishing layer is then applied in an amount of 10 g/m2 to ensure scratch resistance and the desired gloss, the substrate is then dried with 4 Hg lamps of 120 w/cm.

The substrate was tested according to EN16511:2019, some data of which are shown in table 2 with reference to the use of different types of thermoplastic resins:

further provides for the removal by means of removal members 50 of the areas on which the embossing liquid 30 is applied. The composition of this embossing liquid as well as the nature of the interaction between the forming liquid 30 and the material of the anti-wear layer 20 are described in detail in document WO2020039361.

Figure 3:
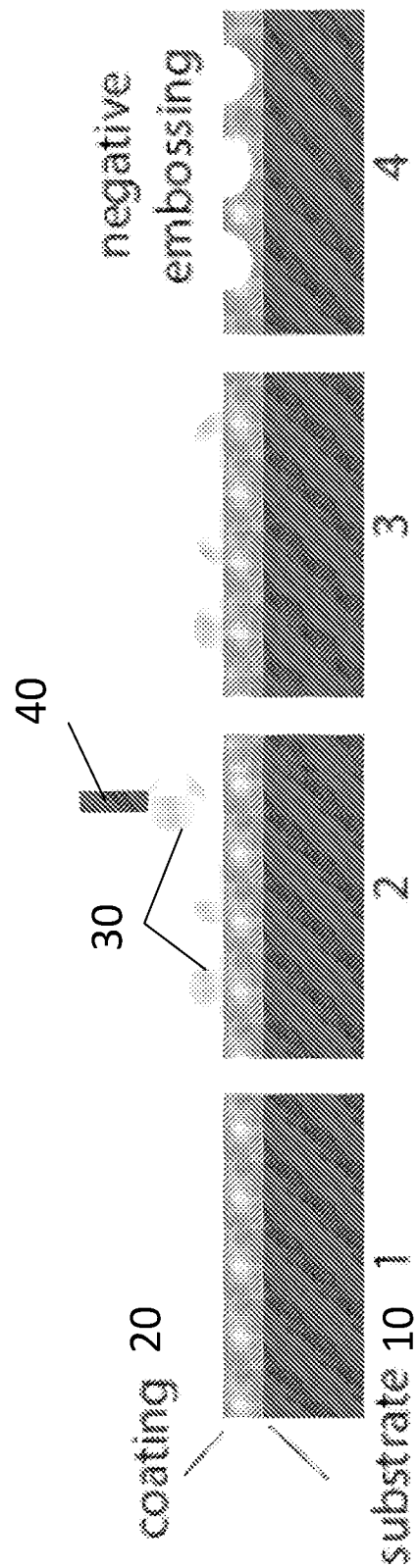
FIG. 3 schematically shows a first embodiment of the three-dimensional structuring method, i.e., surface embossing of the wear-resistant and/or scratch-resistant layer of the panel according to the present invention.

FIG. 4 also shows the step 5 of application of the finishing layer 60 which can be similarly envisaged also in the example of FIG. 3.

Following the step of application of the finishing layer or at the end of the process, if the finishing layer is not provided, the step of heating the heat treatment of the set of layers applied to the substrate is provided even if not illustrated.

The invention claimed is:

1. A decorated panel comprising:
    a substrate;
    a decorative layer applied to at least part of the substrate; and
    a photo cross-linked formulation applied directly or indirectly on a part of the said substrate and/or on a decorative layer, optionally with interposed intermediate layers, the formulation containing:
        at least one light crosslinkable resin;
        at least one thermoplastic resin; and
        at least one polymerization initiator including UV photoinitiators, organic peroxides, or Electron Beam initiators,

| Type | | Ref. | polyamide | PVC | PVC-Ac | PE |
|---|---|---|---|---|---|---|
| Thermoplastic resin | | | ORGASOL 2002 | SOLVIN 550 GA | VINNOL H 40/50 | PEW-4 |
| Content | % | 0 | 8 | 10 | 10 | 15 |
| Taber abrasion | | AC1 | AC4 | AC4 | AC3 | AC2 |
| Dimensional stability | 4 h@80 c. | NOK | OK <1 mm | OK <1 mm | OK <1 mm | OK <1mm |

FIG. 3 shows a schematic example of the texturing process according to one of the preferred but non-limiting embodiments of the anti-wear and/or anti-scratch layer.

With reference to FIG. 3, step 1 shows a more generic embodiment of the present invention in which only the application of an anti-wear and/or anti-scratch layer indicated with 20 on a substrate 10 is provided.

Step 1 provides for the application of said layer 10 made according to one or more of the embodiments and/or variants previously described and preferably by means of a technique that does not involve the use of spraying or ink-jet techniques.

Step 2 shows the application of an embossing liquid indicated with 30, preferably by means of a digital printing process and in particular by means of an ink-jet printing process 40. In this case the described technique is applied with a forming liquid of the type on aqueous basis as specifically and in detail described in WO2018069874.

Step 3 provides for the action of polymerization and/or drying of the layer, for example by irradiation of photonic energy or the like, which leads to step 4 to the finished panel to which it is possible to further apply a finishing layer as shown in the fine examples of FIGS. 1 and 2.

FIG. 4 shows similarly to FIG. 3 the steps of an alternative three-dimensional forming process of the at least one anti-wear layer 20 applied to a substrate 10. In this case, step 4 wherein at least one of said layers is a wear and/or scratch resistant layer,
wherein the combination of the at least one photo-crosslinkable resin with the at least one thermoplastic resin provides thermoplastic behavior that elastically compensates for differential thermal shrinkage between the coating and the substrate, and
wherein at least one of said layers is textured to form a three-dimensional surface.

2. The panel according to claim 1, wherein the substrate comprises at least two opposite faces, and at least one wear and/or scratch resistant layer is applied to one of said faces.

3. The panel according to claim 1, wherein the resin is selected from cationic, radical, or mixed-mode systems.

4. The panel according to claim 1, wherein resin includes non-crosslinkable components such as epoxy, polyurethane, acrylic resins, or their mixtures.

5. The panel according to claim 1, wherein the undergoes dual-cure polymerization.

6. The panel according to claim 1, wherein the thermoplastic resin is selected from: polybenzimidazole (PBI), polycarbonate (PC), polyethylene (PE), polyethylene terephthalate (PET), polymethyl methacrylate (PMMA), polypropylene (PP), polystyrene (PS) or polystyrene, polyvinyl chloride (PVC), polyamide (PA), acrylonitrile butadiene styrene (ABS), polylactic acid (PLA), polytetrafluoroethylene (PTFE), polyethersulfone (PES), polyoxymethylene (POM), polyvinyl acetate (PVAC), ethylene vinyl acetate copolymer (EVA), or mixtures thereof.

7. The panel according to claim 1, wherein the thermoplastic resin is present between 1% and its solubility limit in the formulation.

8. The panel according to claim 1, wherein the thermoplastic resin is dispersed in the crosslinkable matrix.

9. The panel according to claim 1, wherein the formulation further comprises at least one additive from: water, solvents, surfactants, plasticizers, UV stabilizers, antioxidants, defoamers, biocides, dyes, pigments, aluminum oxide, or mixtures thereof.

10. The panel according to claim 1, wherein the wear and/or scratch resistant formulation is textured.

11. The panel according to claim 1, wherein the decoration layer is applied by digital printing.

12. The decorated panel according to claim 1, wherein the decorated panel is optionally heat treated.

13. The panel according to claim 12, wherein the surface becomes opaque after heat treatment.

14. The decorated panel according to claim 1, wherein the substrate comprises plastic, wood, wood-derived material (HDF/MDF), metal, fiber cement, ceramic or combinations thereof.

15. The decorated panel according claim 1, used for architectural coverings, floors and furniture.

* * * * *